United States Patent [19]

Rowe

[11] 4,063,233

[45] Dec. 13, 1977

[54] THREE-DIMENSIONAL DISPLAY DEVICES

[76] Inventor: William Guy Rowe, P.O. Box 425, Boonville, Calif. 95415

[21] Appl. No.: 637,677

[22] Filed: Dec. 4, 1975

[51] Int. Cl.[2] .................. G06F 3/14

[52] U.S. Cl. .................. 340/324 A; 250/458; 250/483; 313/461

[58] Field of Search .................. 313/223, 461, 371, 409, 313/416, 465; 250/440, 355, 483, 458–459; 340/324 A, 343, 166 EL

[56] References Cited

U.S. PATENT DOCUMENTS

| | | | |
|---|---|---|---|
| 2,402,758 | 6/1946 | Leverenz | 313/461 |
| 2,604,607 | 7/1952 | Howell | 313/461 |

*Primary Examiner*—Marshall M. Curtis

*Attorney, Agent, or Firm*—Michael L. Harrison

[57] ABSTRACT

Three-dimensional images are produced within a transparent cathode-ray tube by directing a plurality of electron beams into a cloud of phosphorescent particles and causing the beams to intersect at a point within the cloud. Each individual beam's current is maintained at less than the threshold of luminescence of the particles but the combined currents may be caused to exceed that threshold by a controlled amount thereby producing light spots of variable brightness at the beam intersection point, which point may be directed into any part of the volume of the cloud. The particle cloud is produced by a high-gradient electric field pump. Use of the pump for particle cloud production in such applications as beam testing is also described.

5 Claims, 2 Drawing Figures

THREE-DIMENSIONAL DISPLAY DEVICES

FIELD OF THE INVENTION

The present invention relates to display devices and more particularly to means for visually displaying three variables in a three-dimensional space.

A need exists for apparatus capable of rendering three-dimensional information in response to inputs from electronic computers, radar systems, measurement systems and the like. A particularly acute need is for three-dimensional representations of radar range, azimuth and elevation information. At present, air traffic control is limited by the existing two-dimensional displays which are inherently incapable of combining aircraft range, azimuth and elevation in the same display. As a result, air traffic controllers are required to combine this information mentally. In dense traffic areas, such as those surrounding major airports, clamitous results may occur if mental error intrudes into the correlation of independent displays of range and azimuth, and range and elevation. It is therefore desirable to obtain a display which can eliminate the need for correlation by showing positional relationships among a plurality of objects within a single display in which height, width and depth relationships are analogous to those of the actual objects represented.

Military applications for three-dimensional display devices encompass air defense warning and threat interception, battlefield coordination of air and ground forces, missile-tracking, and, of course, the military counterpart of civilian air traffic control. Given the usual military requirement for quick situation appraisal and reaction, it is particularly desirable to have a display which provides unambiguous analogs of position in three-dimensions thereby rendering unnecessary the time-consuming and error-producing step of coordination of ground position and altitude data which present two-dimensional displays require.

In another field, computer output devices are presently available which are capable of displaying two-dimensional renderings of solid geometrical shapes from any view. Thus, a triangular prism may be first viewed from its side, then rotated to show its base, then rotated again to show the view looking down from the pointed top. More useful displays, for example architectural renderings, may also be so rotated, and data gathered graphically without need for expensive perspective drawings. The drawback to these devices is that the representation of the object is in only two dimensions, and if aesthetic evaluations are involved, the two-dimensional display is a poor substitute for a three-dimensional one. All of the required information is available from the two-dimensional display to allow full technical evaluation of an object but again the mental process involved in correlating the information to give a useful visualization is prone to error. Indeed, for all but extremely simple geometrical shapes, the task is impossible.

In many scientific, engineering, business and economic problems, the behavior of functions of more than one variable is of interest. Graphical display of these functions gives highly useful insight into their behavior. With an interactive computer program, functions of two variables could be displayed and evaluated instantaneously if a three-dimensional display were available for showing these interrelationships.

In the past, a variety of proposals have been advanced for the display of three-axis information. The information contained in the display may be in the form of a pictorial scene, as in television applications, or in the form of three-variable data, such as in radar or computer applications. Two approaches have generally been followed. In one, a three-dimensional display is simulated by relying upon the observer's visual receptors to provide the illusion of three dimensions through assimilation of a stereoptic display. In another, three dimensional images are produced in a space by producing light spots at points in the space such that a solid image is produced within the space. Both approaches have been followed to some degree of success, but both also have met with some obstacles which have prevented widespread employment.

In simulated three-dimensional displays, binocular scene production is generally thought to be directly responsible for depth perception. However, in reality, several factors contribute to depth perception in addition to that of stereoptic viewing. Important factors are the relative rotation or movement parallax relationship of observer and scene, linear perspective, the inverse square law of illumination, depth of focus, and interposition of scene elements.

A stereoptic display typically attenuates several of these factors. Because of the fixed relationship between observer and object, movement parallax is eliminated. Depth focus is fixed by the reproduction screen thereby eliminating depth of focus as a factor. The inverse square law is difficult to reproduce accurately given the present limitations on brightness ranges in existing reproduction equipment.

Elimination or attenuation of these factors can cause ambiguous and unstable images. Therefore, while the use of steroptic reproduction may be considered valuable in certain applications, such as entertainment, in which exact perception of distance is not required, it will be undesirable in applications such as scientific measurement wherein exact relationships must be determined. In the most demanding, i.e. safety-related, applications, simulation of three-dimensional scenes is not acceptable because of the inherent possibilities for ambiguity.

A solid image display which is perceived by the observer in the normal manner, in which the observer is free to move with respect to the image displayed and in which the factors of movement parallax, linear perspective, depth of focus and interposition are all preserved, will avoid the depth perception ambiguities which are possible in three-dimensional simulation. Indeed, of the factors enumerated above us being relevant to depth perception, only the inverse square law factor is likely to be attenuated in a solid image display. Solid images are, therefore, preferred over the simulated images in applications which demand the utmost exactness in information display.

Prior attempts to render solid image displays have suffered from several drawbacks. In one type of display, of which many variants have been proposed, see e.g., Aiken U.S. Pat. No. 3,005,136, Fryklund U.S. Pat. Nos. 2,762,031 and 2,806,216, Marks U.S. Pat. No. 2,961,486, a solid image is created by selectively ionizing portions of a gas. The ionized gas luminesces creating a spot of light. An array of many of these spots of light arranged in accordance with the shape of the image to be rendered creates an image having three dimensions. The drawback to this approach lies in the need for a matrix of electrodes dispersed throughout the volume of the gas which is to be ionized. If a display of acceptable resolution is desired, it will be appreciated that the spots of light must be made to be exceedingly small, and means for producing them must be provided at exceedingly small intervals throughout the volume. The elements of the matrix thus become so multiplied as to absorb a substantial amount of the light which is produced by the gas. Furthermore, the matrix itself can never be completely invisible which causes a distracting structure to interfere with the desired information. It will also be appreciated that in attempting to reduce the size of the matrix elements in order to maximize the light output from the display, the matrix will be rendered exceedingly fragile and will become difficult and therefore costly to manufacture.

In another type of solid image display, see e.g., Marks U.S. Pat. No. 2,961,486, Ketchpel U.S. Pat. No. 3,140,415, Skellet U.S. Pat. No. 3,204,238, a phosphor coated screen is provided within an evacuated envelope. The screen is caused to move by mechanical means so that the entire volume is swept by the phosphor. The motion of the screen may be either rotational or translational. An electron beam is caused to deflect over the screen thereby creating light spots. By arrangement of a series of the spots in the proper order at points throughout the volume, an image in three dimensions is formed. The persistance of the sensation of light in the visual receptors of the observer allows the image to be fully constructed over a finite period of time even though the persistance of the light itself must be made very short with respect to the period of reciprocation of the screen.

While the moving screen approach does provide acceptable solid images, the drawback of requiring a precise mechanical assembly which is capable of rapid motion within an evacuated envelope makes the device difficult to manufacture, while the relative complexity of the task of coordinating the intersection of the electron beam with the moving screen makes the device difficult to integrate into electronic systems whose outputs are usually in Cartesian coordinates.

A more promising approach to production of solid image three-dimensional displays is taught by Howell U.S. Pat. No. 2,604,607 wherein a cathode-ray tube is described having a substantially evacuated envelope, two electron guns with deflection and intensity control means, and a thin gas of nitrogen contained within the envelope. The intensities of the electron guns are controlled to provide a variation in currents. The deflection of the beam is controlled by plates to provide intersection of the beams. Each beam's current is maintained below the luminescence threshold current of the gas, but both beams when combined produce sufficient current to cause luminescence at the point of intersection, if so desired. Intensity modulation is employed to prevent luminescence except at those points where it is desired to cause a light spot to appear. The beam intersection point is caused to scan throughout the volume, from which it can be seen that a three-dimensional arrangement of light spots can be created having arbitrary shape and limited in resolution only by the size of the intersection point and the spacing of the scan lines.

A major difficulty with devices of the class described by Howell arises from the use of an ionizable gas. Nitrogen, the gas described by Howell, for example, has an extremely short time of persistence, on the order of $10^{-8}$ seconds. Since the scan time of the space may be comparatively long, a persistence time in the millisecond range would be desirable.

Successful performance of this type of device relies upon the production of a critical pressure within the envelope. If the pressure within the tube is too high, coresponding to a gas which is too dense, the entire tube will luminesce, and under extreme conditions may undergo catastrophic electrical breakdown. If the pressure is too low corresponding to a gas which is not dense enough, no luminescence will take place, regardless of the intensity of the electron beams. The desirable pressure must be established at the time of manufacturing and must be maintained over the life of the tube. However, changes in pressure occur routinely within vacuum envelopes due to the phenomenon of electrostatic pumping, the effect of which is to remove molecules of gas from the cloud and capture them in unuseable areas of the tube.

Finally, the usefulness of gaseous clouds is limited by the narrow range of colors and light intensities obtainable. Varying color requirements cannot be accommodated by this type of tube since the fundamental atomic structure of the gases determines its luminescent color.

It is also difficult to control the intensity of the illumination which results from ionization of a gas since it is dependent upon the energy of the beams rather than on the current. Thus, nitrogen is either "on" or "off" limiting the usefulness of the display to those applications in which gradations of intensity are not important.

In the design and fabrication of electron tubes, particularly those requiring rather long electron beams such as traveling wave tubes, kylstrons and cathode-ray tubes, and in the experimental study of beam behaviors, it is frequently desired to visually observe the behavior of the beam under varying voltage conditions with varying electrode configurations.

In the past, attempts have been made to provide visual beam tracing by providing florescent screens, by photographing radiation from a residual gas, or by dropping fine particles through the beam in the area of interest. See, e.g., Ausburn, K. J., *Visual and Photographic Study of Electron Beams,* Journal of Applied Physics, Vol 13, Number 1, p. 11, January 1964.

The drawback of the first method lies in its mechanical inconvenience while the drawback of the second has been briefly discussed above in reference to the invention of Howell.

The third method is altogether more satisfactory than the first two, but because of its transient nature, is limited to use with photographic equipment which introduces inconvenience and delay into the data collection and experimentation process.

SUMMARY OF THE PRESENT INVENTION

The principle object of the present invention is to provide a three-dimensional display device capable of producing solid images in response to electrical signal inputs.

It is another object to provide a three-dimensional display device in which the image color can be selected at time of manufacture.

It is still another object of the present invention to provide means for producing a phosphorescent cloud for use in display devices.

It is yet still another object of the present invention to provide an apparatus for visually observing the behavior of electron beams.

Briefly, in accordance with the present invention, three-dimensional images are produced within an evacuated cathode-ray tube by causing electron beams to intersect at a movable point within a cloud of phosphor-surfaced particles. The intensity of the beams is controlled such that the intensity of a single beam is insufficient to cause luminescence of the phosphor, but the combined intensities of the beams are sufficient to cause luminescence at the intersection point of the beams. Variations in intensity are possible up to a maximum intensity limitation which is imposed by the need to keep sufficiently low intensities in individual beams to avoid luminescence along the entire length of a beam, rather than just at the intersection point of the beam.

The intersection point may be positioned arbitrarily throughout the volume of the cloud by means of conventional deflection apparatus. In conjunction with the intensity control capability provided, an arrangement of light spots may be created within the cloud having arbitrary shape, thereby producing an image having height, width and depth.

Production of the cloud of phosphor-surfaced particles is accomplished by means of a high-gradient electric field "pump" having no moving parts but capable of maintaining the phosphor-surfaced particles in a constant state of agitation.

The visual observation of electron beams is provided by an apparatus similar to that described above wherein only one beam is employed, that being the beam whose characteristics are under observation. Instead of limiting beam intensity to that which is barely insufficient to produce luminescence in the particle cloud, the beam intensity is increased relative to the particles' threshold of luminescence so that particles along the entire length of the beam luminesce thereby "tracing" the outline of the beam.

DESCRIPTION OF THE PREFERRED EMBODIMENTS

Figure 1:
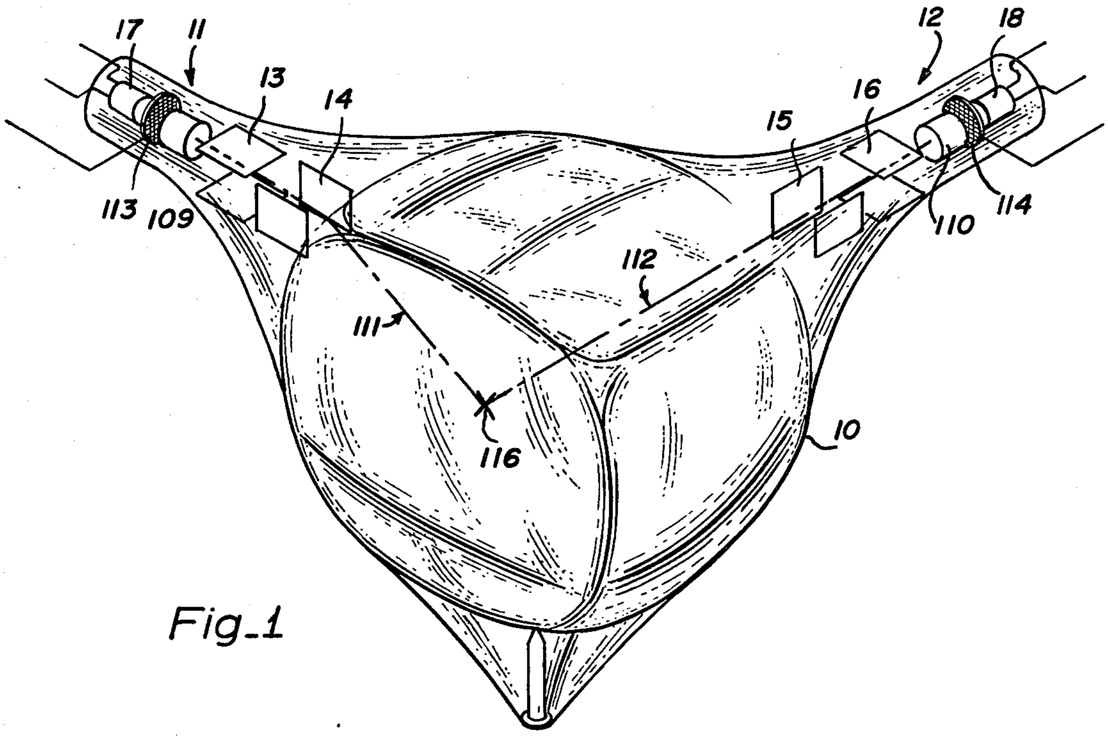
FIG. 1 is a perspective line drawing of a two electron gun version of a cathode-ray tube which employs the features of the present invention.

Referring now to FIG. 1, there is shown a cathode-ray tube incorporating features of the present invention. The device includes a vacuum envelope 10 containing integrally fabricated electron guns 11 and 12. Each electron gun includes two pairs of electrostatic deflection plates 103, 104, 105 and 106, a cathode assembly 107 and 108, and focusing and accelerating electrodes 109 and 110. Electron gun 11 produces the electron beam depicted by the dotted line 111, and electron gun 12 produces the electron beam depicted by the dotted line 112. The intensity of electron beam 111 is controlled by control grid 113. The intensity of electron beam 112 is controlled by control grid 114. Electron beams are formed, focused, intensity controlled and deflected by the above described elements as is well known to those skilled in the art of electron gun design.

The two electron beams 111 and 112 produced by electron guns 11 and 12 respectively are controlled by the deflection plate pairs in response to electrical signals applied to the plates such that the beams always intersect at a point 116 within the display area of the vacuum envelope. The electron guns' axes are arranged at non-straight angles to each other in order to provide a discreet point of intersection for their beams. The vacuum envelope is made to have at least one transparent surface through which images produced within the envelope can be viewed. Manufacture of the vacuum envelope is carried out in the manner well known to those skilled in the art of cathode-ray tube design.

A cloud of particles having a surface material which luminesces under bombardment by electron beams is produced in the display space by means which are described below. A typical luminescent material, and one which has many desirable properties for the present application, is phosphor of which many varieties are available. For convenience, phosphor is described as the material employed in the preferred embodiment. Particles having phosphor surfaces are initially placed in the tube at the time of manufacture. The size of the particles, the persistence of the phosphor and its color, may all be selected from a wide range of values to meet particular applications.

Light spots can be produced at any point within the particle cloud by deflecting the intersection point of the beams to the desired location and increasing the combined beam intensities to a level above the luminescence threshold of the phosphors. At all times, the intensity of any individual beam is maintained below the threshold of luminescence so that the particles struck by the beam do not luminesce at any point other than the intersection point of the beams. Thus, in the two electron gun case being described, the maximum intensity which can bombard any particle(s) is slightly less than twice the luminescent threshold current. In no light spots are desired at any given instant, the combined beam intensities are reduced to a level below the luminescence threshold and, consequently, no light output is produced by the phosphors.

Since the intersection point of the beams can be deflected throughout the volume of the display area, it follows that light spots may be produced in any part of the display area and that an array of spots may be produced which has length, width and depth. Images may be created by deflecting the intersection point over the shape which it is desired to produce in conjunction wih intensity-modulation, by means of the control grids, which causes luminescence of the particles at the desired light intensity and prevents luminescence where no light is required to produce an image.

The method employed to trace an image in the display area may be varied to best fit a particular need. A raster scan may be desirable in some applications but would be of limited utility because of the connsiderable amount of time required to complete it.

A more desirable image forming system for most applications would be a "trace" type of scan in which the outline of image is painted on the cloud.

Figure 2:
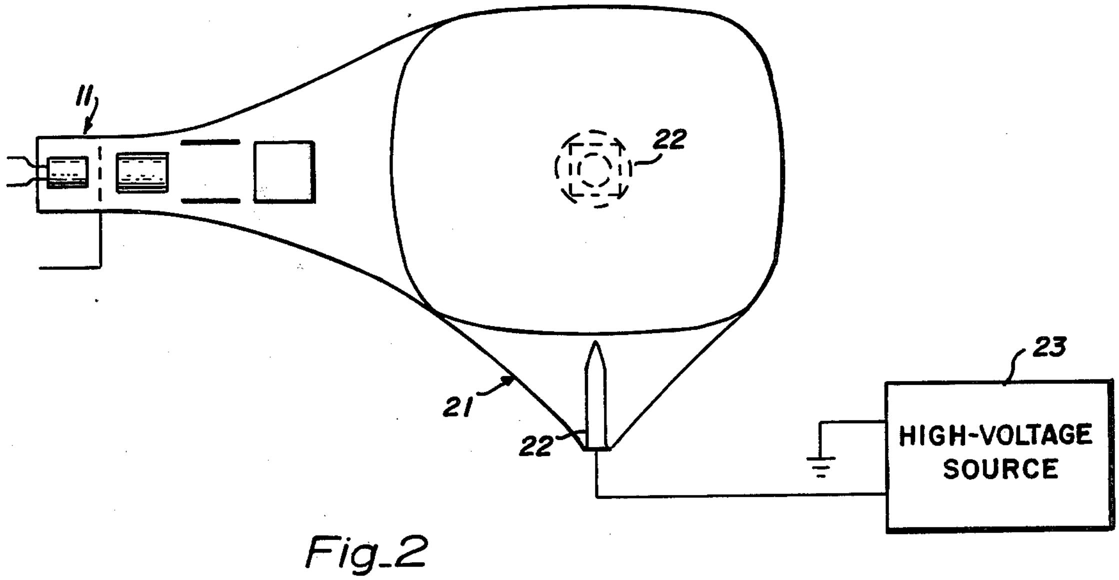
FIG. 2 is a sectional view of the same device depicted in FIG. 1 showing the arrangement of the electrodes which comprise the high gradient electric field "pump" and their connections to a high-voltage power supply.

Referring now to FIG. 2, there is shown a sectional view of a two electron gun version of the cathode-ray tube described. In addition to the elements already mentioned in the description of FIG. 1, there is shown a collection chamber 21, an electrode 22 and a high-voltage source 23. The arrangement shown comprises a pump having no moving parts, which is capable, by means of phenomena to be described below, of physically displacing particles collected in the collection chamber 21 causing them to project into the space which comprises the display area of the envelope. By properly arranging the electrode, and with consideration being given to the geometry of the envelope, the particles may be maintained in a continuous state of agitation in a more or less randomly distributed cloud.

The operation of the pump described can be readily demonstrated in the laboratory. A theoretical explanation of it, however, is not so readily attained. Two phenomena, electrophoresis and dielectrophoresis, both of which have their adherents, have been argued as explaining the pumping action.

Electrophoresis is the well-understood phenomenon by which charged particles move under influence of attractive and repulsive forces in either uniform or non-uniform electric fields. It is readily demonstrated in the laboratory.

Dielectrophoresis refers to the movement of polarized, but neutral, particles in a high-gradient electric field. See, e.g., Pohl, H.A., *Non-Uniform Electric Fields,* Scientific Amercian, Vol. 203, No. 6, Dec., 1960.

Demonstration of dielectrophoresis requires extremely high electric field gradients. Movement of particles by dielectrophoresis is a result of the polarization of the particles in the field and the unequal forces which then result on opposite sides of the particle due to the unequal potentials which are present on opposite ends of the particle in the high gradient field.

Dielectrophoresis may be understood by examining the behavior of uncharged particles in a uniform field, then comparing this behavior with that which results from making the field non-uniform. A neutral particle placed between two electrodes producing an electric field having a uniform gradient will experience polarization to an extent determined by the dielectric constant of the particle and the strength of the field. Since the polarization of the particle results in one side of the particle becoming positively charged and the other side becoming negatively charged, each side of the particle experiences a force tending to attract it toward the oppositely signed electrodes. However, since each side is equally charged, although oppositely signed, the forces attracting each side of the particle are exactly equal, and since the forces act in exactly opposite directions, the resultant force on the particle is zero. Being exposed to zero force, the particle remains unmoved.

If instead of a uniform field the particle is placed in a non-uniform field such as that produced in the vicinity of a sharply pointed electrode, the particle will again become polarized. Now, however, the side of the particle toward the higher gradient side of the field experiences a force greater than that of the side toward the lower gradient portion of the field. The resul is a net force attracting the particle toward the higher gradient portion of the field. In comparison with the movement of charged particles in electric fields (electrophoresis) dielectrophoresis is a mild effect.

For small particles, the distances separating opposite sides of the particles are also small and consequently span small distances of the field. Therefore, to obtain appreciable forces, the gradient of the field must be very high, which implies high voltages and sharply pointed electrodes.

While both theories partially explain the pumping effect described, neither theory completely explains it and it is at present debatable which effect, electrophoresis or dielectrophoresis, predominates. Nonetheless, practical use of the phenomenon is possible despite the absence of an adequate theoretical explanation, and quite energetic movement of particles and liquids can be obtained using this type of pump.

Referring again to FIG. 2, electrode 22 is fabricated in the shape of a sharp spike which assists in attaining a high-gradient field.

Generally, the maximum practical gradient should be employed to obtain satisfactory agitation of the particles. Practical limitations are reached, however, with respect to the highest gradient useable due to the risk of ionization of the particles when extremely high gradients are approached. Appropriate choices of electrode shape and applied voltage must therefore be made for each material with which the phenomenon is to be employed.

Optimization of size and weight of the particles may also be done for supra-molecular sized particles to match their physical characteristics to the maximum attainable pumping forces. Research indicates that for molecular sized particles, the maximum forces attainable on the particles before breakdown is reached are almost insignificant. As particle size is increased, however, the forces become sufficiently large to allow use of the phenomenon in pumping polarizable dielectric fluids or powders.

Satisfactory particles may be made of a powder of solid phosphors or of phosphor-coated, non-phosphor base materials. Lightweight spheres of certain plastics appear to provide the ideal characteristics of uniform cross-section, symmetry and low density. The surface treatment selected may be chosen for desirable color, persistence and threshold level. The ideal choice for these parameters will depend upon the type of display, scan rate and intensity requirements.

In choosing persistence times, it will be desirable to choose frame rates and particle velocity such that little particle displacement occurs within a single frame's period. Optimization of these variables will allow the use of phosphors whose persistence after stimulation covers the period of a single frame without significant image blurring.

In the employment of the above described principles for experimental beam tracing, a substantially evacuated envelope is provided similar to 10 but differing in that only experimental electron guns, and, usually only a single gun, are employed. The beam intensity of the experimental gun is adjusted with respect to the threshold of luminescence of the phosphor so that luminescence occurs along the entire length of the beam.

By means of the high-gradient electric field pump, the particles are maintained in a constant state of agitation and will therefore always be present in some quantity in the path of the electron beam.

In use, the electron gun upon which it is desired to provide evaluation is placed within the evacuated envelope and the pump activated. The electron gun is then energized and directed into the particle cloud. Electrons which impinge upon particles cause those particles to luminesce thereby indicating the space occupied by the electron beam.

By selection of the phosphorescent particles, it is possible to raise or lower the threshold of luminescence to accommodate beams of greater or lesser intensities.

It is desirable in any application of the high-gradient pump to employ screening electrodes to minimize the effect of the field of the pump on the trajectory of the electron beams. It is, of course, particularly desirable to do so in the case of beam tracing applications.

Optimization of the particle size and time of phosphorescence for use in beam tracing is possible and desirable. The time of phosphorescence may be almost arbitrarily adjusted to provide refinement of resolution by providing shorter and shorter times in relation to the time of transit of the particles through the beam. Color and size may be optimized in accordance with the guidelines set forth above.

A related application holding some promise is the use of the above apparatus as a substitute for a cloud chamber or hydrogen bubble chamber in sub-atomic particle research. This application contemplates the use of particle sources other than electron guns causing the particle cloud to luminesce along the path of the particles. By this means, the path, speed and duration of existence may be determined by techniques analogous to those used in cloud and bubble chamber research at the present time.

Other variations of the invention may be practiced, as is evident from consideration of the general operating principles without departure being made from the spirit of the invention.

What is claimed is:

1. An apparatus for visually and photographically evaluating the characteristics of experimental electron beams which comprises:
   - a sealed substantially evacuated envelope having a display space and having a transparent portion for viewing the display space;
   - a plurality of particles having surfaces of luminescent material, contained within the envelope, which particles luminesce when bombarded by electron beams;
   - a collection chamber adjoining the envelope and communicating with the interior of the envelope, and so oriented that the free fall of particles under gravitational attraction results in the accumulation of particles within the chamber;
   - an electrode located within the collection chamber and adapted to produce, when electrified, a high-gradient electric field in the vicinity of the collection chamber for agitating the particles to cause said particles to repetitively traverse the display space;
   - means for introducing experimental electron beams into the display space of the envelope.

2. An apparatus for visually and photographically evaluating the characteristics of ions and sub-atomic particles which comprises:
   - a sealed substantially evacuated envelope having a display space and having a transparent portion for viewing the display space;
   - a plurality of particles having surfaces of luminescent material, contained within the envelope, which particles luminesce when bombarded by ions or sub-atomic particles;
   - a collection chamber adjoining the envelope and communicating with the interior of the envelope, and so oriented that the free fall of particles under gravitational attraction results in the accumulation of particles within the chamber;
   - an electrode located within the collection chamber and adapted to produce, when electrified, a high-gradient electric field in the vicinity of the collection chamber for agitating the particles to cause said particles to repetitively traverse the display space; and,
   - means for introducing ions or sub-atomic particles into the display space of the envelope.

3. An apparatus for displaying three-dimensional optical images within a display volume, in response to applied deflection and intensity control signals, which comprises:
   - a plurality of particles having surfaces of luminescent materials, which particles luminesce when bombarded by electron beams of sufficiently high intensity;
   - a collection chamber adjoining the display space and so oriented that the free fall of particles under gravitational attraction results in the accumulation of particles within the chamber;
   - an electrode located within the collection chamber and adapted to produce, when electrified, a high-gradient electric field in the vicinity of the collection chamber for agitating the particles to cause said particles to repetitively traverse the display space;
   - a plurality of electron guns for producing electron beams, said electron guns so located as to be capable of producing beams which intersect at a point within the cloud of particles;
   - intensity control means for controlling the beam intensities of at least one of the electron beams in response to the applied intensity control signals; and,
   - deflection means for controlling the direction of the electron beams in response to the applied deflection control signals.

4. An apparatus for displaying three-dimensional optical images, in response to applied deflection and intensity control signals, which comprises:
   - a sealed, substantially evacuated envelope having a display space and having a transparent portion for viewing the display space;
   - a plurality of particles having surfaces of luminescent material contained within the envelope which particles luminesce when bombarded by electron beams of sufficiently high intensity;
   - a collection chamber adjoining the envelope and communicating with the interior of the envelope, and so oriented that the free fall of particles under gravitational attraction results in the accumulation of particles within the chamber;
   - an electrode located within the collection chamber and adapted to produce, when electrified, a high-gradient electric field in the vicinity of the collection chamber for agitating the particles to cause said particles to repetitively traverse the display space;
   - a plurality of electron guns for producing electron beams, said electron guns so located as to be capable of producing bemas which intersect at a point within the cloud of particles;
   - intensity control means for controlling the beam intensities of at least one of the electron beams in response to the applied intensity control signals;
   - deflection means for controlling the direction of the electron beams in response to the applied deflection control signals.

5. An apparatus for displaying three-dimensional optical images, in response to applied deflection and intensity control signals, which comprises:
   - a sealed, substantially evacuated envelope having a display space and having a transparent portion for viewing the display space;

at least two electron guns for producing electron beams, mounted in the envelope and directed toward the display space of the envelope;

a collection chamber adjoining the envelope and communicating with the interior of the envelope, and so oriented that the free fall of particles under gravitational attraction results in the accumulation of particles within the chamber;

a plurality of particles having surfaces of luminescent material contained within the envelope, which particles luminesce when bombarded by electron beams of sufficiently high intensity, an electrode located within the collection chamber and adapted to produce, when electrified, a high-gradient electric field in the vicinity of the collection chamber for agitating the particles to cause said particles to repetitively traverse the display space;

means for controlling the direction of the electron beams in response to the applied deflection control signals; and, means for controlling the intensity of the electron beams in response to the applied intensity control signals.

* * * * *